(12) United States Patent
Aufrichtig et al.

(10) Patent No.: US 7,068,854 B1
(45) Date of Patent: Jun. 27, 2006

(54) CORRECTION OF DEFECTIVE PIXELS IN A DETECTOR

(75) Inventors: Richard Aufrichtig, Mountain View, CA (US); Ping Xue, Waukesha, WI (US); Kenneth Scott Kump, Waukesha, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/474,715

(22) Filed: Dec. 29, 1999

(51) Int. Cl.
*G06K 9/40* (2006.01)

(52) U.S. Cl. ............... 382/275; 382/132; 250/208.1

(58) Field of Classification Search ......... 382/205, 382/239, 246, 260, 261, 262, 263, 264, 265, 382/266, 272, 275, 300, 132; 348/247, 272; 345/615; 358/453; 250/208.1, 559.1
See application file for complete search history.

(56) References Cited

U.S. PATENT DOCUMENTS

| | | | |
|---|---|---|---|
| 5,047,863 A | 9/1991 | Pape et al. | 348/247 |
| 5,272,536 A | 12/1993 | Sudo et al. | 348/272 |
| 5,504,504 A * | 4/1996 | Markandey et al. | 345/214 |
| 5,652,621 A | 7/1997 | Adams, Jr. et al. | 348/272 |
| 5,657,400 A | 8/1997 | Granfors et al. | 382/254 |
| 5,821,915 A * | 10/1998 | Graham et al. | 345/615 |
| 5,854,655 A * | 12/1998 | Watanabe et al. | 348/247 |
| 5,875,040 A * | 2/1999 | Matraszek et al. | 358/453 |
| 6,453,073 B1 * | 9/2002 | Johnson | 382/239 |
| 6,792,159 B1 * | 9/2004 | Aufrichtig et al. | 382/260 |

FOREIGN PATENT DOCUMENTS

EP 0778543 A2 6/1997

* cited by examiner

*Primary Examiner*—Samir Ahmed
(74) *Attorney, Agent, or Firm*—Foley & Lardner LLP

(57) ABSTRACT

A detector imaging system having an apparatus and method for correcting defective pixels in an acquired image is disclosed herein. The system includes a correction scheme including temporarily replacing a defective pixel with a linear interpolation of the defective pixel's surrounding neighboring pixel values, determining a local gradient based in part on the acquired image and a gradient kernel, and providing a correction value based on the local gradient to correct the defective pixel. The correction scheme is repeated a plurality of times as desired to correct all the defective pixels in the acquired image.

65 Claims, 6 Drawing Sheets

CORRECTION OF DEFECTIVE PIXELS IN A DETECTOR

BACKGROUND OF THE INVENTION

The present invention relates generally to detector systems. More particularly, the present invention relates to a detector system equipped to correct defective pixel values therein.

A solid state detector contains a plurality of photodetector elements. For example, a radiographic x-ray detector can include several million photodetector elements to correspondingly provide an image having several million pixels. Such a detector typically comprises a scintillating layer in contact with an array of photodiodes arranged in rows and columns. Each photodiode converts impinging light into an electrical charge or signal proportional thereto, and in turn, each electrical signal is processed and converted into a digital value. The resulting array of digital valves comprise the image data for the image to be displayed.

In the course of manufacturing such a detector, a certain number of photodetector elements will invariably be defective. Because pixel size is chosen such that objects of interest in the image will be greater than the size of an individual pixel, a perfect detector is not required for imaging. However, if defective or bad pixels are aggregated in sizeable clusters, the loss of relevant information may be considerable. Alternatively, since defective pixel values would either be independent of the impinging light, because the corresponding detector locations are not photonically and/or electrically responsive, or be dependent of the impinging light but in manner statistically different from its neighboring pixels, if defective pixels are left unaltered in the displayed image, they would distract from the visualization of the rest of the image.

Presently, there are known methods for identifying and correcting defective pixel values prior to displaying the image. These correction methods replace each defective pixel value with an interpolation of its neighboring pixel values. Such correction methods, however, are quite susceptible to creating image artifacts, such as breaks in guide wires, because the correction relies only on the defective pixel's surrounding pixels, i.e., the eight pixels surrounding the defective pixel.

Thus, there is a need for a correction method that provides a more accurate correction of defective pixels. Further, there is a need for an apparatus and method configured to utilize image feature information to perform defective pixel correction.

BRIEF SUMMARY OF THE INVENTION

One embodiment of the invention relates to a method for correcting a defective pixel in an image produced by a detector. The image includes an array of pixels and the array of pixels has a corresponding array of pixel values. The method includes determining a local gradient, the local gradient comprising an array of local gradient matrix elements. The method further includes providing a correction value based on the local gradient to correct the defective pixel.

Another embodiment of the invention relates to a system for correcting a defective pixel in an image produced by a detector. The system includes a processor coupled to the detector, the processor configured to determine a local gradient and to generate a correction value based on the local gradient. The image includes an array of pixels, each pixel having a corresponding pixel value, and the local gradient comprises an array of local gradient matrix elements.

Still another embodiment of the invention relates to a system for correcting a defective pixel in an image produced by a detector. The image includes an array of pixels, the array of pixels having a corresponding array of pixel values. The system includes means for determining a local gradient, the local gradient comprising an array of local gradient matrix elements. The system further includes means for providing a correction value based on the local gradient to correct the defective pixel.

BRIEF DESCRIPTION OF THE DRAWINGS

The preferred embodiment will become more fully understood from the following detailed description, taken in conjunction with the accompanying drawings, wherein like reference numerals denote like elements, in which.

DETAILED DESCRIPTION OF THE INVENTION

Figure 1:
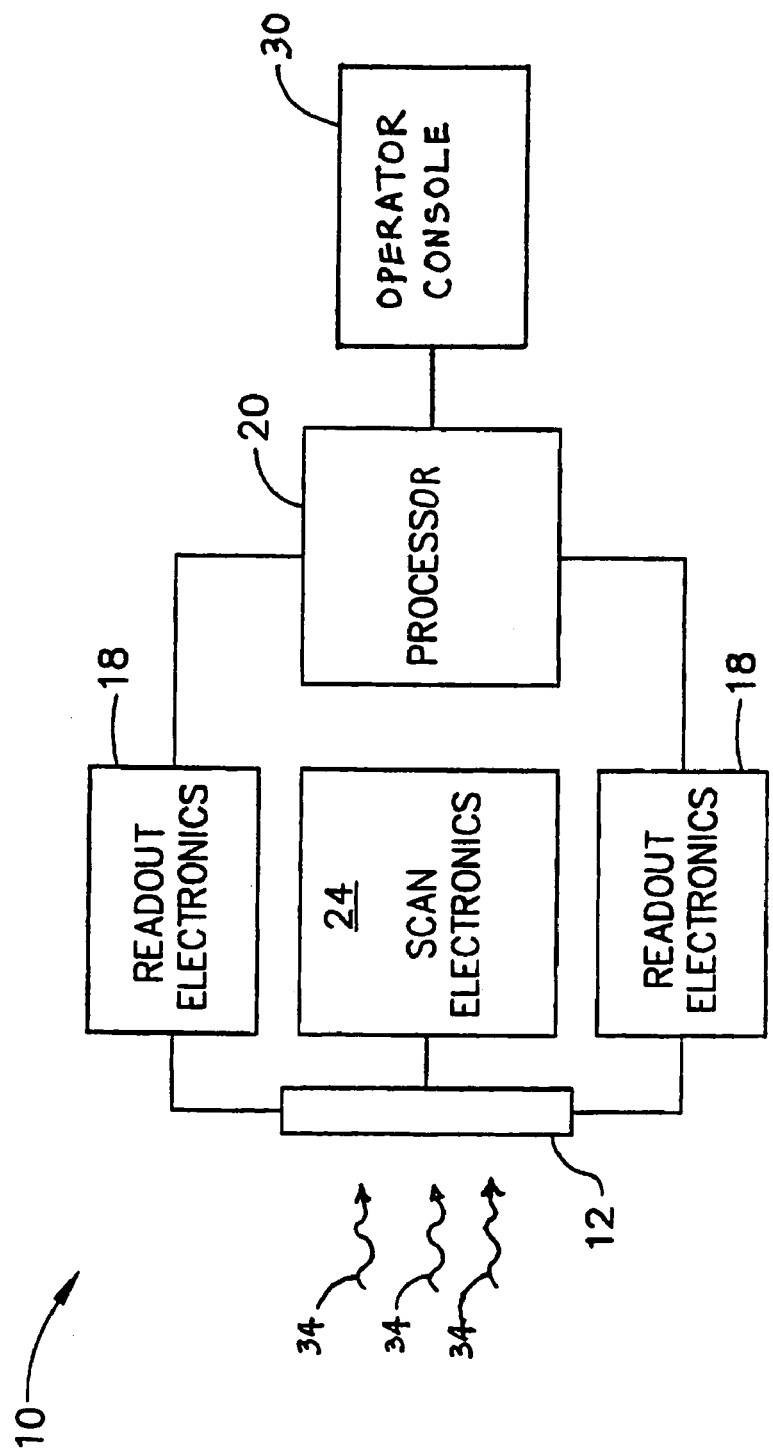
FIG. 1 is a block diagram of a solid state detector imaging system which employs an embodiment of the present invention.

Referring to FIG. 1, there is shown the major components of a solid state detector imaging system 10. System 10 includes a detector 12, a readout electronics 18, a scan electronics 24, a processor 20, and an operator console 30. System 10 is configured to sense photonic energy 34 impinging on the detector 12 and to display an image corresponding to the intensity of such photonic energy on a display device (CRT, LCD, etc.) of the operator console 30. Photonic energy 34 impinges on detector 12, and detector 12 outputs analog signals corresponding to the intensity or energy of photonic energy 34 to readout electronics 18. Readout electronics 18 is coupled to processor 20, and processor 20 is coupled to operator console 30. Scan electronics 24 is coupled to detector 12.

In one embodiment, system 10 is configured to be a x-ray detection imaging system. X-rays are provided by a source and travel through a collimator, to be attenuated by a subject of interest to be imaged, i.e., a patient. Then photonic energy 34 (which in this case are the attenuated x-rays) is received by detector 12 for image display (not shown).

Figure 2:
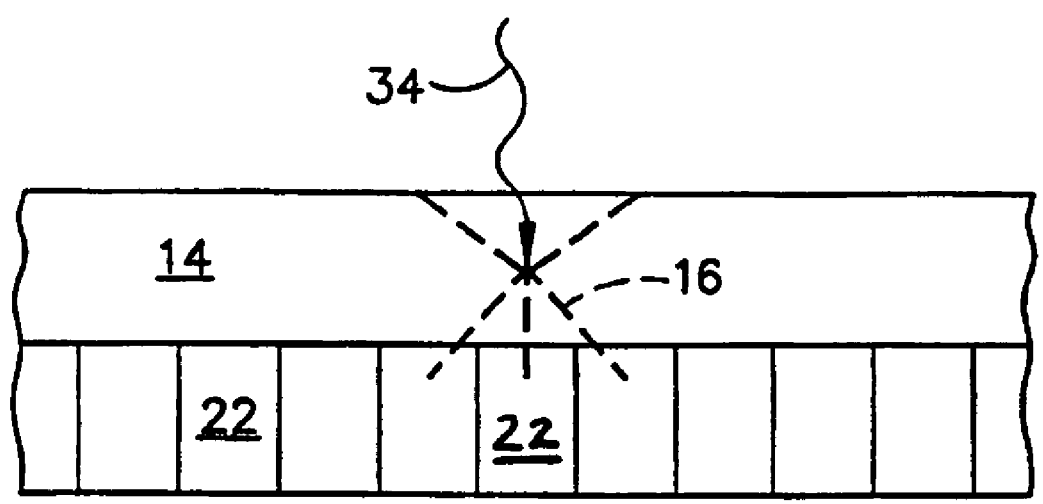
FIG. 2 is a cross-sectional view of a detector which comprises a portion of the solid state detector imaging system of FIG. 1.

Referring to FIG. 2, detector 12 includes a scintillator 14 and an array of photodetector elements 22. Scintillator 14 converts photonic energy 34 from x-rays to light 16 at wavelengths receivable by photodetector elements 22. For example, scintillator 14 may be comprised of thallium (Tl) doped cesium iodide (CsI) that converts x-rays into visible light. Impinging light 16 is converted into an array of electrical signals by corresponding photodetector elements 22. Although not shown, detector 12 may comprise more than one detector.

Each of photodetector elements 22 includes a photodiode comprised of thin film materials, such as amorphous silicon, and a thin film field effect transistor (not shown). In this manner, each of photodetector elements 22 is configured to output an electrical signal proportional to photonic energy 34 impinging thereon to readout electronics 18 and to be controlled by scan electronics 24, such as being "reset" to acquire the next image.

The readout electronics 18 are configured to convert the array of electrical signals, i.e., analog signals, into an array of digital signals that can be processed, stored, and displayed as an image using processor 20 and operator console 30. Alternatively, the digitization of the electrical signals can occur in processor 20. Moreover, in order to reduce the amount of readout electronics 18 required in system 10, photodetector elements 22 can be configured to store the electrical signals until they can be processed by readout electronics 18.

Processor 20 is configured to provide electrical signal processing, into an image data form suitable for image display, storage, transmission to a remote site, film or print record, or other utilization and manipulations. Such processing may include performing defective pixel correction (as described in greater detail hereinafter). Operator console 30 includes various components such as a display device, a storage device, a printer, and an operator control unit (e.g., a mouse, a keyboard, a graphical user interface, etc. (not shown)) to facilitate various utilization and manipulation of the acquired image data. Alternatively, operator console 30 may be omitted and the various output modes of the acquired image data may be carried out in processor 20.

Detector 12 includes a plurality of photodetector elements 22. Depending on factors such as the type of desired imaging, resolution, cost of system, etc., detector 12 can vary in size and construction. For example, for x-ray imaging relatively large portions of the test subject, such as the patient's chest area, a 41×41 cm² active area detector can include several million photodetector elements 22 (e.g., 2048×2048 array of photodetector elements 22) with a pixel pitch of 200×200 μm². As another example, detector 12 may have a smaller active area for use in mammography and have a 100×100 μm² pixel pitch. In still another example, detector 12 may be housed inside a charge-coupled device (CCD) camera with an active area of only 2 cm².

Moreover, it should be understood that system 10 is not limited to x-ray imaging. In another embodiment, system 10 can be configured to acquire images from photonic energy 34 outside the wavelengths of x-rays. Accordingly, detector 12 may include additional components, or components such as scintillator 14 can be omitted.

Because detector 12 includes a large number of photodetector elements 22, it is not unusual for one or more photodetector elements 22 to be defective. Such photodetector elements 22 are defective because they are not responding photonically or electrically, or because they respond electrically but in a manner statistically different from other photodetector elements 22 with similarly impinged photonic energy 34. Consequently, defective photodetector elements 22 produce defective electrical signals and ultimately defective pixel values in the displayed image, if left unaltered. While it may be unpractical and expensive to refabricate defective photodetector elements 22, it is possible to correct or mask defective pixel values before the acquired image is displayed.

Before such a correction scheme is implemented, defective pixels of detector 12 are identified using one or more conventionally known methods. For example, during calibration and setup of system 10, all the defective pixels of detector 12 can be identified by analyzing known images, e.g., an image containing no structure, and searching for nonconforming or unexpected pixel values. For more details relating to identification of defective pixels, reference is made to U.S. Pat. No. 5,657,400 owned by the General Electric Company, which is incorporated herein by reference. From this identification step, n number of defective pixels can be identified for detector 12.

Figure 3:
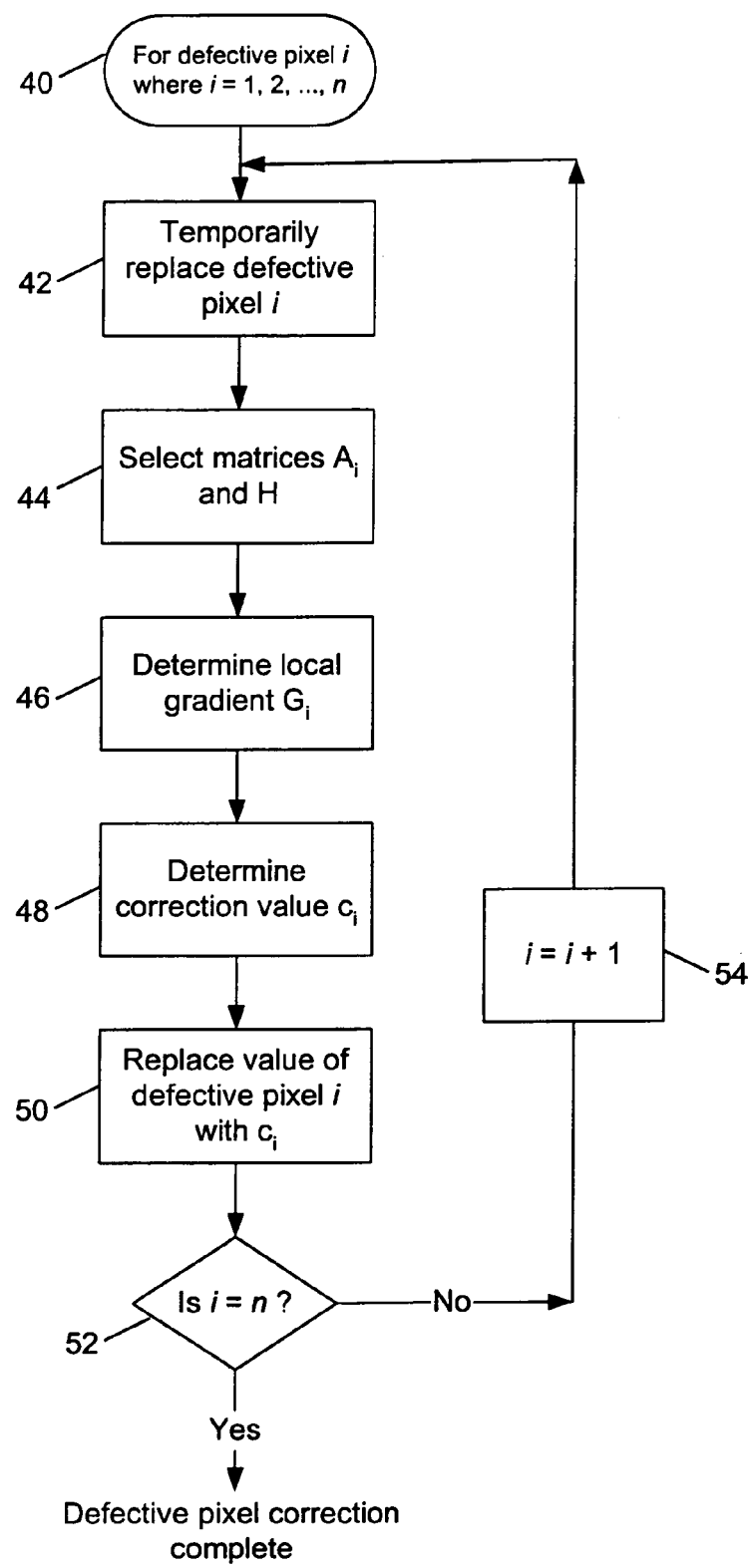
FIG. 3 is a flowchart of a defective pixel correction scheme implemented in the solid state defector system of FIG. 1.

After a current image has been acquired using detector 12, each defective pixel i in the current acquired image, where i=1, 2, . . . , n, can be corrected or masked. Referring to FIG. 3, there is shown a flowchart of an image feature or gradient method for correcting defective pixel values. The correction scheme preferably occurs in processor 20 after the array of electrical signals have been converted into digital signals. The correction scheme includes a temporarily replace defective pixel step 42, a select matrices step 44, a determine local gradient step 46, a determine correction value step 48, a replace defective pixel value step 50, a check step 52, and an incrementor step 54. For each defective pixel i, steps 42–54 are carried out to provide a correction thereto.

In step 42, the value of defective pixel i is temporarily replaced with a linear interpolation of its surrounding neighboring pixel values. Details relating to linear interpolation are provided in U.S. Pat. No. 5,657,400, which has already been incorporated herein by reference. Alternatively, step 42 may be omitted and the correction may be performed without determining the linear interpolation of defective pixel i.

After step 42, the selection of matrices $A_i$ and H are carried out in step 44. $A_i$ is a matrix of the pixel values comprising the acquired image with the value of defective pixel i temporarily replaced by $t_i$ (in step 42). In the case of a detector 12 including 2048×2048 array of photodetector elements 22, $A_i$ can be up to a 2048×2048 matrix. Alternatively, $A_i$ can be smaller than a 2048×2048 matrix, comprised of $t_i$, as the center matrix element, and its surrounding neighboring pixels as the remaining matrix elements. For example, $A_i$ may be a 7×7 matrix.

H is a gradient kernel matrix. In one embodiment, H is a 7×7 Laplacian of a Gaussian filter kernel defined by the values:

| H = | 0.0235 | 0.0235 | 0.0235 | 0.0235 | 0.0235 | 0.0235 | 0.0235 |
|---|---|---|---|---|---|---|---|
| | 0.0235 | 0.0235 | 0.0256 | 0.0355 | 0.0256 | 0.0235 | 0.0235 |
| | 0.0235 | 0.0256 | 0.3034 | 0.7128 | 0.3034 | 0.0256 | 0.0235 |
| | 0.0235 | 0.0355 | 0.7128 | −5.0694 | 0.7128 | 0.0355 | 0.0235 |
| | 0.0235 | 0.0256 | 0.3034 | 0.7128 | 0.3034 | 0.0256 | 0.0235 |
| | 0.0235 | 0.0235 | 0.0256 | 0.0355 | 0.0256 | 0.0235 | 0.0235 |
| | 0.0235 | 0.0235 | 0.0235 | 0.0235 | 0.0235 | 0.0235 | 0.0235 |

In another embodiment, H can be of a different matrix size, such as 11×11 or 5×5. Moreover, H can be a variety of gradient kernels, such as a Roberts, Prewitt, or Sobel gradient kernel. It shall be understood that the matrix size of $A_i$ and the matrix type and size of H can be preset such that step 44 may be omitted. The selection capability in step 44 provides flexibility in noise immunity vs. edge strength.

After step 44, determination of a local gradient, $G_i$ around temporarily replaced pixel $t_i$ is carried out in step 46. In one embodiment, $G_i$ is calculated by:

$$G_i = \sqrt{(A_i * H)^2 + (A_i * (-H))^2}$$

For example, when $A_i$ and H are both 7×7 matrices, $G_i$ will be a 7×7 matrix. Alternatively, $G_i$ can be determined by a variety of other equations such that $G_i$ provides relative gradient information about the pixels surrounding defective pixel i (the surrounding pixels as specified by $A_i$) with respect to image features, such as a strong edge, embodied by these surrounding pixels. Thus the matrix elements of $G_i$ having the highest values, i.e., strongest gradients, correspond to pixels comprising the strongest image features for that portion of the image.

Using $G_i$ calculated in step 46, a correction value $c_i$ to correct defective pixel i is determined in step 48. Correction value $c_i$ is a linear average or a weighted average of the ith defective pixel's surrounding neighboring pixel values with the highest gradients and/or closest proximity to defective pixel i. Correction value $c_i$ insures that defective pixel i is replaced with image information along an image gradient, i.e. based on more global image information such as image features, instead of very local image information only. Any well-known linear averaging or weighted averaging methods can be utilized to determine $c_i$.

For example, step 48 can comprise a weighted average based on the three highest gradient pixel values within a three-pixel radius of defective pixel i. Then the pixel values corresponding to the highest, the second highest, and third highest gradient pixel, respectively, would be given a weight of 50%, 30%, and 20%, respectively. In another example, step 48 can comprise a weighted average based on the three highest gradient pixel values within a three-pixel radius of defective pixel i with greater weight given to pixels closer in location to defective pixel i. Assume that for these three highest gradient pixels, one pixel is located at each of one-pixel, two-pixel, and three-pixel radius of defective pixel i. Then the pixel values located at the one-pixel, two-pixel, and three-pixel radius of defective pixel i, respectively, would be given a weight of 50%, 30%, and 20%, respectively.

Once $c_i$ has been determined in step 48, the value of defective pixel i (actually $t_i$ from step 42) is replaced with the correction value $c_i$ in step 50. If all the defective pixels in a given image have not been corrected (i.e., i<n), then step 52 directs the defective pixel correction to be performed for the next defective pixel (i.e., i=i+1 in step 54). Otherwise if all the defective pixels in a given acquired image have been corrected (i.e., i=n), then step 52 directs the defective pixel correction process to end for this acquired image. Thus the final image, to be displayed, printed, etc., is the acquired image with correction of its defective pixels.

Figure 4:
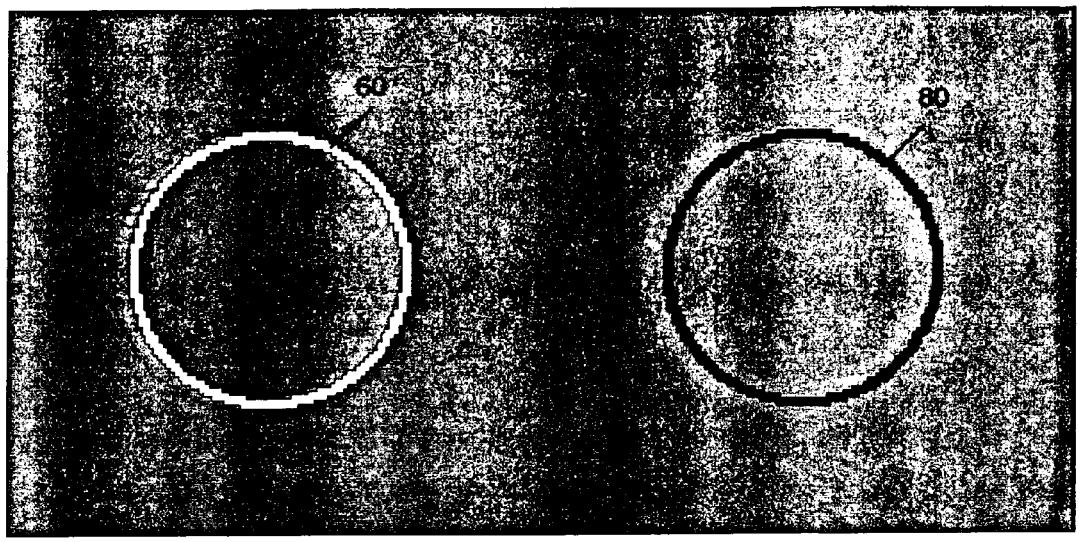
FIG. 4 is a sample image with no defective pixels.
Figure 5:
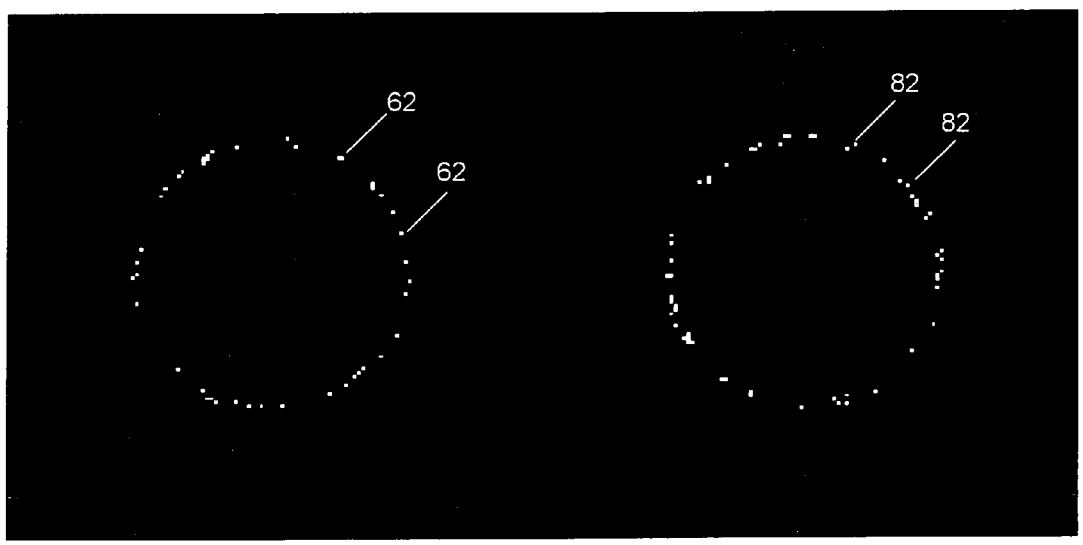
FIG. 5 is a sample map of defective pixels.

In FIGS. 4–9, an illustrative comparison of a final image generated using a conventional correction method and a final image generated using an embodiment of the present invention is provided. FIG. 4 is an image containing no defective pixels. The image includes, with respect to the background, a first circle 60 having positive contrast and a second circle 80 having a negative contrast. In FIG. 5, a map of a plurality of defective or bad pixels 62, 82 is shown. Defective pixels 62, 82 are introduced or merged with first and second circles 60, 80, respectively, to form the start or "acquired" image.

Figure 6:
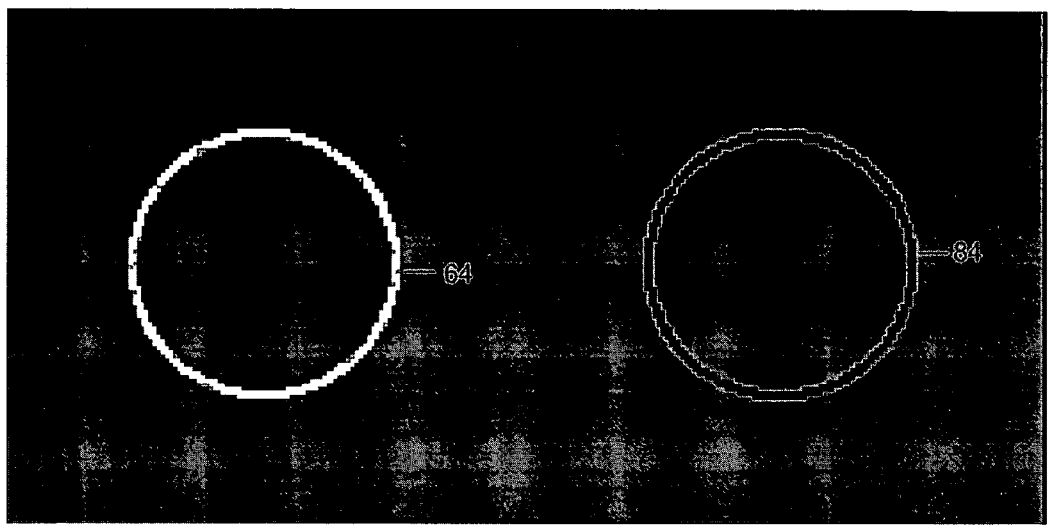
FIG. 6 is a sample image using a conventional correction method.
Figure 7:
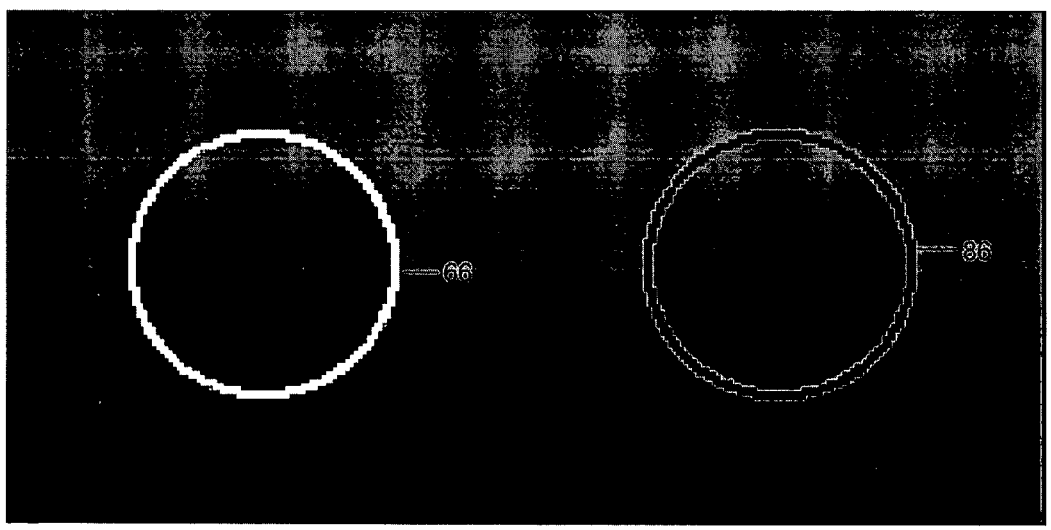
FIG. 7 is a sample image using an embodiment of the defective pixel correction scheme of the present invention.

The defective pixels of this start or "acquired" image are corrected (e.g., the defective pixel map shown in FIG. 5) to generate the final image, using (a) a conventional correction method such as linear interpolation (in FIG. 6), or (b) an embodiment of the gradient method (in FIG. 7).

Figure 8:
FIG. 8 is a sample map of pixel differences between the image with no defective pixels of FIG. 4 and the image using the conventional correction method of FIG. 6.
Figure 9:
FIG. 9 is a sample map of pixel differences between the image with no defective pixels of FIG. 4 and the image using an embodiment of the present invention of FIG. 7.

The advantage of using the gradient method over the conventional method is readily apparent in FIGS. 8 and 9. FIG. 8 shows the pixel differences between the image containing no defective pixels (FIG. 4) and the image corrected with the conventional method (FIG. 6). Similarly, FIG. 9 shows the pixel differences between the image containing no defective pixels (FIG. 4) and the image corrected with the gradient method (FIG. 7). Thus, the gradient method results in a much smaller number of deviating pixels, i.e., insufficiently corrected or not corrected pixels, than the conventional method. Moreover, the gradient method is better capable of preserving image features and edges, such as features 64, 84 (see FIG. 6), than the conventional method, such as features 66, 86 (see FIG. 7).

While the embodiments and application of the invention illustrated in the FIGs. and described above are presently preferred, it should be understood that these embodiments are offered by way of example only. For example, it is contemplated that the invention may be applied to systems other than medical systems which can benefit from the use of defective pixel correction. Still further, the present invention may be implemented using hardware, software, and/or firmware. Even still further, the correction values of the defective pixels (i.e., $c_i$) can be linked with its acquired image in a variety of manner, such as permanently replacing the defective pixel values on the acquired image or separately storing the correction values with links to the corresponding defective pixel locations. Accordingly, the present invention is not limited to a particular embodiment, but extends to various modifications that nevertheless fall within the scope of the appended claims.

The invention claimed is:

1. A method for correcting a defective pixel in an image produced by a detector, the image including an array of pixels and the array of pixels having a corresponding array of pixel values, comprising:
   (a) determining a local gradient, the local gradient comprising a plurality of local gradient matrix elements; and
   (b) providing a correction value based on the local gradient to correct the defective pixel;
   wherein step (b) of providing a correction value includes at least one of a linear interpolation and a weighted average of pixel values corresponding to pixels selected based on a determination that they had the highest local gradient.

2. The method of claim 1, wherein the highest local gradient matrix elements include at least three highest local gradient matrix elements.

3. The method of claim 1, wherein the weighted average of pixel values having the highest local gradient matrix elements include giving greater weight to pixel values proximate to the defective pixel.

4. A method for correcting a defective pixel in an image produced by a detector, the image including an array of pixels and the array of pixels having a corresponding array of pixel values, comprising:
   (a) determining a local gradient, the local gradient comprising a plurality of local gradient matrix elements;
   (b) providing a correction value based on the local gradient to correct the defective pixel identifying the defective pixel in the image produced by the detector before the determining step (a);

replacing the defective pixel with a temporary value based on a linear interpolation of a surrounding neighboring pixels of the defective pixel before the determining step (a) such that determining the local gradient comprises determining the local gradient using the temporary value of the defective pixel; and replacing the defective pixel with the correction value after the providing step (b).

5. A system for correcting a defective pixel in an image produced by a detector, comprising:

a processor coupled to the detector, the processor configured to determine a local gradient and to generate a correction value based on the local gradient, wherein the image includes an array of pixels, each pixel having a corresponding pixel value, and the local gradient comprising an array of local gradient matrix elements;

wherein the at least a portion of the array of pixel values comprises a matrix, and includes the defective pixel as a center matrix element and each surrounding neighboring pixel of the defective pixel as additional matrix elements; and wherein the correction value comprises at least one of a linear interpolation and a weighted average of pixel values corresponding to pixels selected based on a determination that they had the highest local gradient.

6. The system of claim 5, wherein the processor is configured to determine the local gradient partly from a gradient kernel and at least a portion of the array of pixel values.

7. The system of claim 6, further comprising an operator console coupled to the processor and configured to select a matrix size of the at least a portion of the array of pixel values and to select the gradient kernel from a group including a Laplacian of a Gaussian filter kernel, a Roberts gradient kernel, a Prewitt gradient kernel, and a Sobel gradient kernel.

8. The system of claim 5 wherein the highest local gradient matrix elements include at least three highest local gradient matrix elements.

9. The system of claim 8, wherein the weighted average of pixel values having the highest local gradient matrix elements include providing greater weight to pixels proximate to the defective pixel.

10. The system of claim 5, wherein the detector comprises an array of photodetector elements, each photodetector element configured to convert an impinging photonic energy into an electrical signal proportional thereto.

11. The system of claim 5, wherein the processor is configured to determine the local gradient and to generate the correction value for each of a plurality of defective pixels in the image produced by the detector.

12. A system for correcting a defective pixel in an image produced by a detector, the image including an array of pixels, the array of pixels having a corresponding array of pixel values, comprising:

(a) means for determining a local gradient, the local gradient comprising an array of local gradient matrix elements; and (b) means for providing a correction value based on the local gradient to correct the defective pixel.

13. The system of claim 12, wherein the local gradient is determined in part from a gradient kernel and at least a portion of the array of pixel values.

14. The system of claim 13, wherein the at least a portion of the array of pixel values comprises a matrix, and includes the defective pixel as a center matrix element and a surrounding neighboring pixels of the defective pixel as remaining matrix elements.

15. The system of claim 13, further comprising means for selecting a matrix size of the at least a portion of the array of pixel values and means for selecting the gradient kernel from a group including a Laplacian of a Gaussian filter kernel, a Roberts gradient kernel, a Prewitt gradient kernel, and a Sobel gradient kernel.

16. The system of claim 12, wherein the correction value comprises at least one of a linear interpolation and a weighted average of pixel values corresponding to pixels selected based on a determination that they had the highest local gradient.

17. The system of claim 16, wherein the highest local gradient matrix elements include at least three highest local gradient matrix elements.

18. The system of claim 16, wherein the weighted average of pixel values having the highest local gradient matrix elements include providing greater weight to pixels proximate to the defective pixel.

19. The system of claim 12, wherein the means for determining and the means for providing include determining the local gradient and generating the correction value, respectively, for each of a plurality of defective pixels in the image produced by the detector.

20. The system of claim 12, further comprising:

means for replacing temporarily the defective pixel with a temporary value based on a linear interpolation of a surrounding neighboring pixels of the defective pixel before the determining step (a) such that determining the local gradient comprises determining the local gradient using the temporary value of the defective pixel; and means for replacing the defective pixel with the correction value.

21. The system of claim 20, wherein the means for replacing includes at least one of replacing the defective pixel with the correction value, and storing the correction value with an identifying link to the defective pixel in a storage device.

22. A method for correcting a defective pixel in an image produced by a digital x-ray detector, the image including an array of pixels and the array of pixels having a corresponding array of pixel values, the method comprising:

acquiring an image from the digital x-ray detector;

identifying the defective pixel in the image produced by the detector before determining a local gradient;

determining a local gradient, the local gradient comprising an array of local gradient matrix elements;

temporarily replacing the defective pixel with a temporary value based on a linear interpolation of a surrounding neighboring pixels of the defective pixel before determining a local gradient such that determining the local gradient comprises determining the local gradient using the temporary value of the defective pixel;

providing a correction value, which is based on the local gradient, to correct the defective pixel; and replacing the defective pixel with the correction value;

wherein the at least a portion of the array of pixel values comprises a matrix, and includes the defective pixel as a center matrix element and each surrounding neighboring pixel of the defective pixel as additional matrix elements.

23. The method of claim 22, wherein determining a local gradient includes determining the local gradient in part from a gradient kernel and at least a portion of the array of pixel values.

24. The method of claim 23, wherein the at least a portion of the array of pixel values comprises a matrix, and includes the defective pixel as a center matrix element and a surrounding neighboring pixels of the defective pixel as remaining matrix elements.

25. The method of claim 23, further comprising:
selecting a matrix size of the at least a portion of the array of pixel values; and
selecting the gradient kernel from a group including a Laplacian of a Gaussian filter kernel, a Roberts gradient kernel, a Prewitt gradient kernel, and a Sobel gradient kernel.

26. The method of claim 22, wherein the correction value comprises at least one of a linear interpolation and a weighted average of pixel values corresponding to pixels selected based on a determination that they had the highest local gradient.

27. The method of claim 26, wherein the highest local gradient matrix elements include at least three highest local gradient matrix elements.

28. The method of claim 26, wherein the weighted average of pixel values having the highest local gradient matrix elements include giving greater weight to pixel values proximate to the defective pixel.

29. A method for correcting a defective pixel in an image produced by an x-ray detector having a defective input at the pixel, the image including an array of pixels and the pixels having corresponding pixel values, the method comprising:
receiving the image from the x-ray detector;
analyzing global characteristics of pixels in proximity to the defective pixel; and correcting the defective pixel based on the global characteristics;
wherein the pixels in Proximity to the defective pixel whose global characteristics are analyzed include at least a few pixels that are within a three pixel radius of the defective pixel, and that do not border the defective pixel.

30. The method of claim 29 wherein analyzing global characteristics of pixels in proximity to the defective pixel comprises determining gradient pixel values of pixels in proximity to the defective pixel.

31. The method of claim 30, wherein correcting the defective pixel based on the global characteristics comprises determining a correction value for the defective pixel using the gradient pixel values of pixels in proximity to the defective pixel.

32. The method of claim 29, wherein the pixels surrounding the detective pixel whose global characteristics are analyzed include at least those pixels within a 5 by 5 array where the defective pixel is at a center of the array.

33. The method of claim 32, wherein analyzing global characteristics of pixels in proximity to the defective pixel comprises analyzing characteristics of an array made of about seven columns and about seven rows of pixels, where the defective pixel is at a center of the array.

34. The method of claim 29, wherein the pixels in proximity to the defective pixel whose global characteristics are analyzed include at least those pixels that are not defective and that are within a three pixel radius of the defective pixel.

35. A method for correcting a defective pixel in an image produced by a digital detector having a defective input at the defective pixel, the image including an array of pixels and the pixels having corresponding pixel values, the method comprising:
analyzing a characteristic of each of a plurality of pixels;
selecting a first pixel of the plurality of pixels having a first pixel value based on the analyzed characteristic of the first pixel;
selecting a second pixel of the plurality of pixels having a second pixel value based on the analyzed characteristic of the second pixel;
selecting a third pixel of the plurality of pixels having a third pixel value based on the analyzed characteristic of the third pixel; and
providing a pixel value for the defective pixel using the first second, and third pixel values;
wherein the analyzed characteristic comprises a gradient of the pixel being analyzed; and
wherein determining the gradient for each pixel includes temporarily replacing the pixel value of the defective pixel with a calculated pixel value;
wherein the first pixel, the second pixel, and the third pixel selected may be different for each image.

36. The method of claim 35, wherein the provided pixel value comprises a linear average of pixel values from pixels that are not defective.

37. The method of claim 35, wherein the gradient for each pixel is determined by at least one of a Laplacian of a Gaussian filter kernel, a Roberts gradient kernel, a Prewitt gradient kernel, and a Sobel gradient kernel.

38. A method for correcting a defective pixel in an image produced by a digital detector having a defective input at the defective pixel, the image including an array of pixels and the pixels having corresponding pixel values, the method comprising:
analyzing a characteristic of each of a plurality of pixel, the characteristic comprising a gradient;
selecting a first pixel of the plurality of pixels having a first pixel value based on the analyzed characteristic of the first pixel;
selecting a second pixel of the plurality of pixels having a second pixel value based on the analyzed characteristic of the second pixel;
selecting a third pixel of the plurality of pixels having a third pixel value based on the analyzed characteristic of the third pixel; and
providing a pixel value for the defective pixel using the first, second, and third pixel values;
wherein the gradient for each pixel is determined by $$G_i = \sqrt{(A_i * H)^2 + (A_i * (-H))^2}$$

where $A_1$ is a matrix of pixel values comprising the image and H is a gradient kernel matrix.

39. The method of claim 35, wherein the first, second, and third pixels are selected based on having a highest gradient value of the plurality of pixels that are analyzed.

40. The method of claim 35, wherein providing a pixel value for the defective pixel using the first, second, and third pixel values comprises averaging the pixel values used to provide a pixel value for the value of the defective pixel.

41. The method of claim 40, wherein averaging the pixels values comprises using a linear average of the pixel values.

42. The method of claim 40, wherein averaging the pixels values comprises using a weighted average of the pixel values.

43. The method of claim 42, wherein a weight assigned to each pixel value used to provide the pixel value of the defective pixel is based on a characteristic used to select the pixel to be used to provide a value for the defective pixel.

44. The method of claim 42, wherein a weight assigned to each pixel value used to provide the pixel value of the defective pixel is based on a proximity of the pixel to be used to provide a value for the defective pixel to the defective pixel.

45. The method of claim 35, wherein the first, second, and third pixels are further selected based on whether they border the defective pixel in the array of pixels.

46. The method of claim 35, wherein the analyzed characteristic of the plurality of pixels are calculated based on pixel values of the pixels.

47. The method of claim 35, wherein the characteristic analyzed comprises a characteristic selected from a group consisting of edge strength, gradient strength, and image feature strength.

48. A method for correcting a defective Pixel in an image produced by a detector having a defective input pixel, the image including an array of pixels and the pixels having corresponding pixel values, the method comprising:
receiving an image from the detector; and
selecting which values to use to provide a value for the defective pixel for the image based on a characteristic of the image, the characteristic of the image comprising gradient values of a plurality of pixels in the image, the plurality of pixels neighboring the defective pixel; and
providing the value for the defective pixel for the image;
wherein providing the value for the defective pixel for the image includes at least one of a linear interpolation and a weighted average of pixel values corresponding to pixels selected based on a determination that they had highest local gradients of the gradient values of the plurality of pixels in the image neighboring the defective pixel.

49. A method for correcting a defective pixel in an image produced by a detector having a defective input pixel, the image including an array of pixels and the pixels having corresponding pixel values, the method comprising:
receiving an image from the detector; and
selecting which values to use to provide a value for the defective pixel for the image based on a characteristic of the image, the characteristic of the image comprising gradient values of a plurality of pixels in the image, the plurality of pixels neighboring the defective pixel;
wherein the gradient values of the plurality of pixels in the image neighboring the defective pixel are determined by a process comprising replacing the defective pixel with a temporary value, the temporary value based on values of neighboring pixels of the defective pixel.

50. The method of claim 49, wherein,
the image is received from an x-ray detector; and
selecting which values to use to provide a value for the defective pixel for the first image based on a characteristic of the first image comprises,
analyzing a characteristic of each of a plurality of pixels, the characteristic for each of the plurality of pixels based on pixel values of the first image;
selecting a first pixel of the plurality of pixels having a first pixel value based on the analyzed characteristic of the first pixel;
selecting a second pixel of the plurality of pixels having a second pixel value based on the analyzed characteristic of the second pixel; and
providing a pixel value for the defective pixel for the first image using the first and second pixel values.

51. The method of claim 50, wherein determining the gradient for each pixel includes temporarily replacing the pixel value of the defective pixel with a calculated pixel value.

52. The method of claim 51, wherein the calculated pixel value is a linear average of pixel values from pixels that are not defective.

53. The method of claim 50, wherein the gradients for the first and second pixels are determined by at least one of a Laplacian of a Gaussian filter kernel, a Roberts gradient kernel, a Prewitt gradient kernel, and a Sobel gradient kernel.

54. A method for correcting a defective pixel in an image produced by an x-ray detector having a detective input pixel, the image including an array of pixels and the pixels having corresponding pixel values, the method comprising:
receiving an image from the x-ray detector; and
selecting which values to use to provide a value for the defective pixel for the image based on a characteristic of the image, comprising,
analyzing a characteristic of each of a plurality of pixels, the characteristic for each of the plurality of pixels comprising a gradient of the plurality of pixels;
selecting a first pixel of the plurality of pixels having a first pixel value based on the analyzed characteristic of the first pixel;
selecting a second pixel of the plurality of pixels having a second pixel value based on the analyzed characteristic of the second pixel: and
providing a pixel value for the defective pixel for the first image using the first and second pixel values;
wherein the gradient for the first and second pixels are determined by applying $$G_i = \sqrt{(A_i * H)^2 + (A_i * (-H))^2}$$

where $A_i$ is a matrix of pixel values comprising the image and H is a gradient kernel matrix.

55. The method of claim 50 wherein the first and second pixels are selected based on having a highest gradient value of the plurality of pixels that are analyzed.

56. The method of claim 50, wherein providing a value for the defective pixel using values of a plurality of pixels comprises averaging pixel values used to provide a pixel value for the defective value.

57. The method of claim 56, wherein averaging the pixels values comprises using a linear average of the pixel values.

58. The method of claim 56, wherein averaging the pixels values comprises using a weighted average of the pixel values.

59. The method of claim 58, wherein a weight assigned to each pixel value used to provide the pixel value of the defective pixel is based on the characteristic used to select the pixel to be used to provide a value for the defective pixel.

60. The method of claim 58, wherein a weight assigned to each pixel value used to provide the pixel value of the defective pixel is based on a proximity of the pixel to be used to provide a value for the defective pixel to the defective pixel.

61. The method of claim 50, wherein the first and second pixels are selected such that they border the defective pixel in the array of pixels.

62. The method of claim 61, wherein the characteristic analyzed comprises a characteristic selected from a group consisting of edge strength, gradient strength, and image feature strength.

63. The method of claim 50, further comprising displaying the image to a user, wherein the displayed image comprises the first pixel value, the second pixel value, and the pixel value provided for the defective pixel.

64. The method of claim 50, further comprising repeating a process of analyzing a characteristic of each of a plurality of pixels, the characteristic for each of the plurality of pixels based on pixel values; selecting a first pixel of the plurality of pixels having a first pixel value based on the analyzed characteristic of the first pixel; selecting a second pixel of the plurality of pixels having a second pixel value based on the analyzed characteristic of the second pixel; and providing a pixel value for the defective pixel using the first and second pixel values for each of the defective pixels of the digital detector.

65. The method of claim 50, further comprising determining which pixels of the digital detector are defective before an image to be corrected is received from the digital detector.

* * * * *